United States Patent Office 3,046,276
Patented July 24, 1962

3,046,276
S-TRIAZOLO-[2,3-c]PYRIMIDINE DERIVATIVES
George William Miller and Francis Leslie Rose, Macclesfield, England, assignors to Imperial Chemical Industries Limited, London, England, a corporation of Great Britain
No Drawing. Filed June 3, 1960, Ser. No. 33,626
Claims priority, application Great Britain June 15, 1959
7 Claims. (Cl. 260—256.4)

This invention relates to heterocyclic compounds and more particularly it relates to s-triazolo-[2,3-c]pyrimidine derivatives which possess valuable therapeutic properties.

According to the invention we provide s-triazolo-[2,3-c]pyrimidine derivatives of the formula:

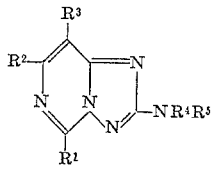

wherein $R^1$, $R^2$ and $R^3$, which may be the same or different, stand for hydrogen or for alkyl radicals, optionally substituted, or for alkenyl or halogeno radicals, $R^4$ stands for hydrogen or for an alkyl radical, optionally substituted, or for an alkenyl or acyl radical and $R^5$ stands for an alkyl radical, optionally substituted, or for an alkenyl or aralykyl radical, or $R^4$ and $R^5$ are joined together to form, with the adjacent nitrogen atom, a heterocyclic ring, and the salts thereof.

As suitable examples of the substituents $R^1$, $R^2$ and $R^3$ there may be mentioned methyl, ethyl, propyl, amyl, hexyl, heptyl, allyl, trifluoromethyl, 2:3-dihydroxypropyl, chlorine and bromine radicals. The substituents $R^4$ and $R^5$ which are alkyl radicals, optionally substituted, may be for example, methyl, ethyl, propyl, butyl, hexyl, octyl, β-hydroxyethyl or methoxycarbonylmethyl radicals. The substituent $R^4$, which can additionally be an acyl radical may be an acetyl or benzoyl radical. Likewise, the substituent $R^5$, which can be an alkenyl or aralkyl radical, may be an allyl or benzyl radical. The substituents $R^4$ and $R^5$ may be joined together to form, with the adjacent nitrogen atom, a piperidino or morpholino ring.

Preferred groups of compounds are those wherein $R^1$ and $R^2$ stand for lower alkyl radicals, $R^3$ stands for hydrogen, $R^4$ stands for hydrogen or for a lower alkyl radical and $R^5$ stands for a lower alkyl or alkenyl radical, the said lower alkyl or alkenyl radicals, the same or different, being methyl, ethyl, n-propyl, n-butyl or allyl radicals. Preferred compounds are 2-methylamino-, 2-ethylamino-, 2-n-propylamino- and 2-allylamino-7-methyl-5-n-propyl-s-triazolo[2,3-c]pyrimidine, 2-diethylamino-7-methyl-5-n-propyl-s-triazolo[2,3 - c]pyrimidine and 2-methylamino-5:7-di-n-propyl-s-triazolo[2,3-c]pyrimidine.

The compounds of the invention may be isolated and used as such or in the form of salts thereof for example as inorganic salts such as hydrochlorides, sulphates or phosphates or as organic salts such as oxalates salicylates, succinates, tartrates, cinnamates or resinates, the latter being obtained for example by the use of sulphonated cross-linked polystyrene resins as the acidic portion of the molecule.

According to a further feature of the invention we provide a process for the manufacture of the said s-triazolo-[2,3-c]pyrimidine derivatives which comprises treating a pyrimidylsemicarbazide derivative of the formula:

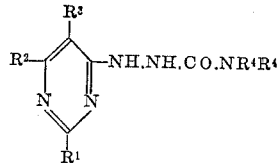

wherein $R^1$, $R^2$, $R^3$, $R^4$ and $R^5$ have the meanings stated above, with a dehydrating agent whereby the elements of water are removed and ring closure takes place.

It is to be understood that under the reaction conditions necessary to effect dehydration and ring closure, molecular re-arrangement takes place and the products of the reaction are not s-triazolo[4,3-c]pyrimidine derivatives but s-triazolo[2,3-c]pyrimidine derivatives. It is also to be understood that the said process cannot be used when any of the substituents $R^1$, $R^2$, $R^3$, $R^4$ and $R^5$ are reactive substituents which might interact with the said dehydrating agent.

A convenient dehydrating agent may be for example phosphorus oxychloride or phosphorus pentoxide.

The said reaction may be carried out in the presence of a solvent or diluent and it may be accelerated or completed by the application of heat.

The pyrimidylsemicarbazide derivatives used as starting materials may be obtained by the reaction of the corresponding hydrazinopyrimidine derivative with the corresponding carbamyl halide derivative, and the pyrimidylsemicarbazide derivatives used as starting materials for the manufacture of those of the said s-triazolo-[2,3-c]-pyrimidine derivatives wherein $R^4$ stands for hydrogen may be obtained by the reaction of the corresponding hydrazinopyrimidine derivative with the corersponding isocyanate. Both reactions may conveniently be carried out in a solvent or diluent, for example benzene. The hydrazinopyrimidine derivatives themselves may be obtained by the reaction of the corresponding halogeno-pyrimidine derivative with hydrazine.

According to a further feature of the invention we provide a process for the manufacture of the said s-triazolo[2,3-c]pyrimidine derivatives which comprises desulphurization of a pyrimidylthio-semicarbazide derivative of the formula:

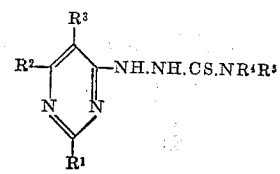

wherein $R^1$, $R^2$, $R^3$, $R^4$ and $R^5$ have the meaning stated above.

The said desulphurization may be carried out for example by heating with a desulphurization agent for example lead oxide, mercuric oxide or copper sulphate. It is to be understood that the pyrimidylthiosemicarbazide derivative may be present in the form of an s-alkyl or an s-aralkyl derivative thereof for example the s-ethyl derivative, and the desulphurization process may then be carried out by the action of heat alone or more conveniently by heating with a desulphurization agent for example lead oxide.

The reaction may be carried out in the presence of a solvent or diluent, for example β-ethoxyethanol, and it may be accelerated or completed by the application of heat.

The pyrimidylthiosemicarbazide derivatives used as starting materials may be obtained by the reaction of the corresponding hydrazinopyrimidine derivative with the corresponding thiocarbamyl halide derivative, and the pyrimidylthiosemicarbazide derivatives used as starting materials for the manufacture of the said s-triazolo[2,3-c]pyrimidine derivatives wherein $R^4$ stands for hydrogen may be obtained by the reaction of the corresponding hydrazinopyrimidine derivative with the corresponding isothiocyanate.

According to a further feature of the invention we provide a process for the manufacture of those of the said s-triazolo[2,3-c]pyrimidine derivatives wherein $R^4$ stands for hydrogen or an acyl radical, which comprises the reaction of an s-triazolo-[2,3-c]pyrimidine derivative of the formula:

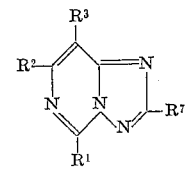

wherein $R^1$, $R^2$ and $R^3$ have the meaning stated above and $R^6$ stands for a lower alkyl radical, with an alkylating, alkenylating or aralkylating agent.

It is to be understood that under certain reaction conditions the acyl substituent ($COR^6$) is removed by hydrolysis thereby being replaced by a hydrogen atom.

Suitable alkylating agents may be, for example, alkyl derivatives of inorganic acids, for example dimethyl sulphate. The said removal of the acyl substituent ($COR^6$) may take place in the presence of alkali metal hydroxides, for example sodium hydroxide at elevated temperatures.

The reaction may be carried out in the presence of a solvent or diluent, for example water, and it may be accelerated or completed by the application of heat.

The 2-acylamino-s-triazolo[2,3-c]pyrimidine derivatives used as starting materials may be obtained by the acylation of the corresponding 2-amino-s-triazolo[2,3-c]pyrimidine derivatives. The 2-amino-s-triazolo[2,3-c]pyrimidine derivatives themselves may be obtained by the reaction of the corresponding 6-hydrazinopyrimidine derivatives with a cyanogen halide under essentially acidic reaction conditions.

According to a further feature of the invention we provide a process for the manufacture of those of the said s-triazolo[2,3-c]pyrimidine derivatives wherein $R^4$ stands for an acyl radical which comprises the reaction of an s-triazolo[2,3-c]pyrimidine derivative of the formula:

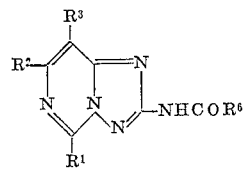

wherein $R^1$, $R^2$, $R^3$ and $R^5$ have the meaning stated above, with an acylating agent.

The said acylating agent may be for example an acid anhydride for example acetic anhydride, or an acid halide for example propionyl chloride or benzoyl chloride. The reaction may conveniently be carried out in the presence of a diluent or solvent for example acetic acid. The said diluent or solvent may simultaneously act as an acid-binding agent and may thus be an organic base for example pyridine. The reaction may be accelerated or completed by the application of heat.

According to a further feature of the invention we provide a process of manufacture of those of the said s-triazolo[2,3-c]pyrimidine derivatives wherein $R^1$, $R^2$, $R^3$ and $R^5$ have the meaning stated above and $R^4$ stands for hydrogen or for an alkyl radical, optionally substituted, or for an alkenyl radical or $R^4$ and $R^5$ are joined together to form, with the adjacent nitrogen atom, a heterocyclic ring, which comprises the reaction of an s-triazolo[2,3-c]pyrimidine derivative of the formula:

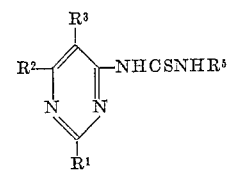

wherein $R^1$, $R^2$ and $R^3$ have the meaning stated above and $R^7$ stands for a reactive replaceable substituent, with an amine of formula $HNR^4R^5$ wherein $R^4$ and $R^5$ have the meanings stated immediately above.

The said reactive replaceable substituent ($R^7$) may be for example a halogen radical, for example a bromine atom, or an alkylsulphonyl radical for example a methylsulphonyl radical.

The reaction may be carried out in the presence of a solvent or diluent for example ethanol and it may be accelerated or completed by the application of heat.

According to a further feature of the invention we provide a process for the manufacture of those of the said s-triazolo[2,3-c]pyrimidine derivatives wherein $R^1$, $R^2$ and $R^3$ have the meaning stated above and wherein $R^4$ stands for hydrogen and $R^5$ stands for an alkyl or an aralkyl radical which comprises reaction of a pyrimidine derivative of the formula:

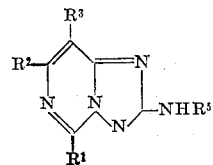

wherein $R^1$, $R^2$, $R^3$ and $R^5$ have the meanings stated immediately above, with hydrazine in the presence of a desulphurizing agent for example lead oxide.

The reaction is preferably carried out in the presence of a solvent or diluent for example β-ethoxyethanol and may be accelerated or completed by the application of heat.

According to a further feature of the invention we provide a process for the manufacture of those of the said s-triazolo[2,3-c]pyrimidines wherein $R^1$, $R^2$ and $R^3$ have the meaning stated above and wherein $R^4$ stands for hydrogen $R^5$ stands for an alkyl radical containing at least 3 carbon atoms or for a dihydroxyalkyl radical containing at least 3 carbon atoms which comprises reaction of an s-triazolo[2,3-c]pyrimidine derivative of the formula:

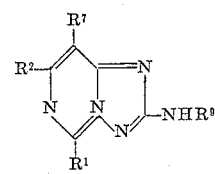

wherein $R^1$ and $R^2$ have the meaning stated above and $R^8$ stands for hydrogen or for an alkyl radical or for an alkenyl radical and $R^9$ stands for an alkyl or alkenyl radical, provided that at least one of the groups $R^8$ and $R^9$ stand for an alkenyl radical, with a reducing agent or an oxidizing agent.

The said reducing agent is preferably hydrogen in the presence of a metal catalyst and the said oxidizing agent is preferably potassium permanganate. The reaction may be carried out in the presence of a solvent or diluent and may be accelerated or completed by the application of heat.

The compounds of the invention possess valuable therapeutic properties in that they exhibit high bronchodilatory activity and they are therefore useful in the treatment of asthma and other respiratory dysfunctions. The said compounds also exhibit activity as anti-inflammatory agents, as analgesics, as sedatives and as anti-tussive agents.

According to a further feature of the invention we provide pharmaceutical compositions comprising at least one s-triazolo[2,3-c]pyrimidine derivative of the formula:

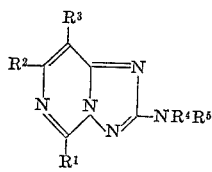

wherein $R^1$, $R^2$ and $R^3$, which may be the same or different, stand for hydrogen or for alkyl radicals, optionally substituted, or for alkenyl or halogeno radicals, $R^4$ stands for hydrogen or for an alkyl radical, optionally substituted, or for an alkenyl or acyl radical and $R^5$ stands for an alkyl radical, optionally substituted, or for an alkenyl or aralkyl radical or $R^4$ and $R^5$ are joined together to form, with the adjacent nitrogen atom, a heterocyclic ring, or a salt thereof, in admixture with a non-toxic, pharmaceutical carrier therefor.

The pharmaceutical compositions may be for oral or parenteral administration or for topical application and they may be, for example, in the form of tablets, capsules, aqueous solutions, aqueous suspensions, oily solutions, oily suspensions or emulsions.

Particularly useful compositions are oral compositions by which the active ingredient can be administered in the form of a solid composition for example as a tablet, pill or capsule, or a liquid composition for example as a solution, syrup or suspension or as a dispersible powder. The said compositions are preferably formulated so that when the compositions are used as bronchodilators, or analgesics, each dosage unit contains between 1 mg. and 500 mg., preferably between 10 mg. and 100 mg. of active ingredient and when the compositions are used in the treatment of rheumatoid arthritis, each dosage unit contains between 10 mg. and 750 mg., preferably between 200 mg. and 500 mg. of active ingredient.

The pharmaceutical compositions may also be in a form suitable for parenteral administration for example as an injectable solution or suspension in an aqueous or oily medium, or as a sterile powder or dispersible powder from which an injectable solution or suspension can be prepared.

The pharmaceutical compositions may also be in a form suitable for topical application for example as powders for insufflation, as sprays for inhalation or as an aerosol preparation.

The said compositions may optionally contain in addition one or more known drugs. These known drugs may include for example an antihistamine or other anti-inflammatory agent for example 9-(2-dimethylaminopropyl)-10-thia-1:9-diaza - anthracene, prednisolone, hydrocortisone, a N-2,4-dimethylphenylacetamidine salt or N-amino-N'-p-tolyguanidine, a sedative for example phenobarbitone an antibacterial agent for example sulphadimidine or penicillin V, or other drugs possessing bronchodilatory activity for example adrenaline or isoprenaline.

The invention is illustrated but not limited by the following example in which the parts are by weight:

*Example 1*

A mixture of 1.8 parts of 4-methyl-6-(4'-methylsemicarbazido-1')-2-n-propylpyrimidine and 25 parts of phosphorus oxychloride is heated under reflux for 3 hours. Most of the excess of phosphorus oxychloride is then removed by distillation under reduced pressure and the residue is poured onto ice. The resulting solution is neutralized by addition of concentrated aqueous sodium hydroxide solution and the mixture is cooled to 0° C. It is filtered and the residue is washed with ice water and dried at 60° C. The dry solid is then heated under reflux with ethyl acetate, the hot mixture filtered and the filtrate is then evaporated to a small volume and cooled to 0° C. The mixture is then filtered and the residual solid is crystallized from ethyl acetate. There is thus obtained 7-methyl-2-methylamino-5-n-propyl-s - triazolo[2,3 - c]pyrimidine as a white crystalline solid, M.P. 121–122° C.

The 4-methyl - 6 - (4'-methylsemicarbazido-1')-2-n-propylpyrimidine used as starting material may be obtained as follows:

5 parts of 6-hydrazino-4-methyl-2-n-propyl-pyrimidine are dissolved in 25 parts of boiling anhydrous benzene. A solution of 0.6 part of methyl isocyanate in 75 parts of anhydrous benzene are added slowly to the boiling solution. After the addition is completed a white gelatinous precipitate separates. The suspension is heated under reflux during a further 7 minutes and is then cooled to 18–22° C., diluted with 100 parts of ether and cooled to 0° C. The mixture is filtered, and the residue is washed with ether and crystallized from ethanol. There is thus obtained 4-methyl-6-(4'-methylsemicarbazido-1')-2-n-propylpyrimidine as a colorless crystalline solid, M.P. 225–226° C.

*Example 2*

The process described in Example 1 is repeated using 8 parts of 6-(4'-ethylsemicarbazido-1')-4-methyl-2-n-propylpyrimidine, M.P. 210° C. and 67 parts of phosphorus oxychloride as starting materials. The crude product obtained after drying at 60° C. is crystallized from ethyl acetate. There is thus obtained 2-ethylamino-7-methyl-5-n-propyl-s-triazolo-[2,3-c]pyrimidine as a colorless crystalline solid, M.P. 133–134° C.

*Example 3*

7.5 parts of 6 - (4',4' - diethylsemicarbazido - 1')-methyl - 2 - n - propylpyrimidine and 50 parts of phosphorus oxychloride are heated under reflux during 4 hours. The mixture is then evaporated to a small volume under reduced pressure and the residue is poured onto ice. The aqueous mixture so obtained is neutralized with concentrated aqueous sodium hydroxide and extracted several times with ethyl acetate. The ethyl acetate extract is dried and evaporated to dryness giving an oil which is dissolved in petroleum ether (B.P. 40–60° C.). This solution is then cooled to 0° C. whereupon a crystalline solid separates which is removed by filtration, washed with ice-cold petroleum ether (B.P. 40–60° C.) and dried. There is thus obtained 2-diethylamino-7-methyl-5-n-propyl-s-triazolo[2,3-c]pyrimidine as a colorless crystalline solid, M.P. 35–36° C.

The 6 - (4',4' - diethylsemicarbazido - 1') - 4 - methyl-2-n-propylpyrimidine used as starting material may be obtained as follows:

20 parts of 6-hydrazino-4-methyl-2-n-propylpyrimidine are dissolved in 53 parts of benzene under reflux and 8.16 parts of diethylcarbamyl chloride are added. The mixture is heated under reflux for 10 minutes and then cooled to 18–22° C. 50 parts of ether are then added to the mixture after which it is cooled in ice-water and filtered. The filtrate is evaporated to dryness giving a solid residue which is crystallized from ethyl acetate. There is thus obtained 6-(4',4'-diethylsemicarbazido-1')-4-methyl-2-n-propylpyrimidine, M.P. 158–160° C.

*Example 4*

The process described in Example 3 is repeated using 9 parts of 2,4-dimethyl-6-(4'-methylsemicarbazido-1')pyrimidine, M.P. 234° C., and 150 parts of phosphorus oxychloride as starting material. The ethyl acetate extract so obtained is washed with water, dried and evaporated to dryness. The residue is crystallized from ethanol and there is thus obtained 2-methylamino-5,7-dimethyl-s-triazolo[2,3-c]pyrimidine, M.P. 172° C.

*Example 5*

The process described in Example 4 is repeated using as starting materials, 9 parts of 2-n-propyl-4-methyl-6-(4'-n-butylsemicarbazido-1'-)pyrimidine, M.P. 186–188° C., and 167 parts of phosphorus oxychloride. There is thus obtained 2 - n-butylamino-5-n-propyl-7-methyl-s-triazolo-[2,3-c]pyrimidine, M.P. 84–85° C. (from petroleum ether, B.P. 60–80° C.).

*Example 6*

The process described in Example 1 is repeated using as starting materials, 10 parts of 2-n-propyl-4-methyl-6-(4'-allylsemicarbazido-1')pyrimidine, M.P. 200° C., and 84 parts of phosphorus oxychloride. There is thus obtained 2 - allylamino - 5 - n - propyl - 7 - methyl - s - triazolo-[2,3-c]pyrimidine, M.P. 114° C. (from ethyl acetate).

*Example 7*

The process described in Example 4 is repeated using as starting materials 5 parts of 2-n-propyl-4-methyl-6(4'-tert. - octylsemicarbazido - 1' - )pyrimidine, M.P. 140° C. (prepared from 2-n-propyl-4-methyl-6-hydrazinopyrimidine and tert.-octylisocyanate i.e. 1,1,3,3-tetramethyl-n-butylisocyanate) and 86 parts of phosphorus oxychloride. There is thus obtained 2-tert.-octylamino-5-n-propyl-7-methyl-s-triazolo[2,3-c]pyrimidine, M.P. 72–74° C. (from petroleum ether, B.P. 40–60° C.).

*Example 8*

The process described in Example 4 is repeated using as starting materials 9 parts of 2,4-di-n-propyl-6-(4'-methylsemicarbazido-1'-)pyrimidine, M.P. 184° C., and 134 parts of phosphorus oxychloride. There is thus obtained 2 - methylamino - 5,7 - di - n - propyl - s - triazolo-[2,3-c]-pyrimidine, M.P. 85–86° C. (from ether/petroleum ether, B.P. 40–60° C.).

*Example 9*

The process described in Example 1 is repeated using as starting materials 10 parts of 2-n-pentyl-4-methyl-6-(4'-allylsemicarbazido-1'-)pyrimidine, M.P. 180–182° C., and 84 parts of phosphorus oxychloride. There is thus obtained 2-allylamino-5-n-pentyl-7-methyl-s-triazolo[2,3-c]-pyrimidine, M.P. 90–91° C. (from petroleum ether, B.P. 60–80° C.).

*Example 10*

The process described in Example 4 is repeated using as starting materials 10 parts of 2-n-propyl-4-methyl-5-allyl - 6 - (4' - n - butylsemicarbazido - 1' - )pyrimidine, M.P. 94–96° C., and 167 parts of phosphorus oxychloride. There is thus obtained 2 - n - butylamino - 5 - n - propyl-7 - methyl - 8 - allyl - s - triazolo[2,3 - c]pyrimidine, M.P. 84–85° C. (from ethyl acetate).

*Exampe 11*

The process described in Example 4 is repeated using as starting materials 7 parts of 2-n-propyl-4-n-heptyl-6-(4'-n-butylsemicarbazido-1'-)pyrimidine, M.P. 174–176° C. and 117 parts of phosphorus oxychloride. There is thus obtained 2-n-butylamino-5-n-propyl-7-n-heptyl-s-triazolo[2,3-c]pyrimidine, M.P. 63–64° C. (from petroleum ether, B.P. 60–80° C.).

*Example 12*

The process described in Example 4 is repeated using as starting materials 4.5 parts of 2-n-propyl-4-methyl-5-n-hexyl-6-(4' - n - butylsemicarbazido-1'-)pyrimidine, M.P. 89–90° C. (from 2-n-propyl-4-methyl-5-n-hexyl-6-hydroxypyrimidine, M.P. 77–78° C. to the corresponding chloro compound and the corresponding hydrazino compound which is reacted with n-butylisocyanate) and 75 parts of phosphorus oxychloride. There is thus obtained 2-n-butylamino - 5-n-propyl-7-methyl-8-n-hexyl-s-triazolo-[2,3-c]pyrimidine, M.P. 68–69° C. (from petroleum ether B.P. 40–60° C.).

*Example 13*

23 parts of 4-(4'-n-butylsemicarbazido-1')-2-n-propyl-6-trifluoromethylpyrimidine, M.P. 177–178° C. and 167 parts phosphorus oxychloride are heated under reflux for 3 hours. After distilling off excess of phosphorus oxychloride, the residue is poured onto a solution of 60 parts sodium hydroxide and 400 parts of ice. The precipitate is removed by filtration and is crystallized from petroleum ether (B.P. 60–80° C.). There is thus obtained 2-n-butylamino-5-n-propyl - 7 - trifluoromethyl-s-triazolo[2,3-c]pyrimidine, M.P. 104–105° C.

*Example 14*

The process described in Example 4 is repeated using as starting materials 5 parts of 2-n-propyl-4-methyl-6-(4'-methoxycarbonylmethylsemicarbazido - 1' - )pyrimidine, M.P. 164° C. and 84 parts of phosphorus oxychloride. There is thus obtained 2-methoxycarbonylmethyl-amino-5-n-propyl-7-methyl-s-triazolo[2,3 - c]pyrimidine, M.P. 139–140° C. (from ethanol).

*Example 15*

3 parts of 4-methyl-6-(4'-methylthiosemicarbazido-1')-2-n-propylpyrimidine are dissolved in 28 parts of 2-ethoxyethanol and 11.2 parts of litharge are added. The suspension is heated under reflux during 1½ hours and then cooled to 18–22° C. and filtered. The filtrate is then evaporated to dryness under reduced pressure and the solid residue is crystallized first from ethyl acetate and then from petroleum ether (B.P. 60-80° C.). There is thus obtained 7-methyl-2-methylamino-5-n-propyl-s-triazolo-[2,3-c]pyrimidine as a colorless crystalline solid, M.P. 120–122° C.

The 4-methyl - 6 - (4'-methylthiosemicarbazido-1')-2-n-propylpyrimidine used as starting material may be obtained as follows:

5 parts of 6-hydrazino-4-methyl-2-n-propylpyrimidine are dissolved in 20 parts of benzene under reflux and 2.2 parts of methyl isothiocyanate are added dropwise to the solution. When the addition is completed the solution is heated under reflux for 5 minutes. The suspension is then cooled to 20° C., diluted with 20 parts of ether and cooled to 0° C. The mixture is filtered and the solid residue is washed with ether and crystallized from ethanol. There is thus obtained 4-methyl-6-(4'-methylthiosemicarbazido-1')-2-n-propylpyrimidine as a colorless solid, M.P. 179–180° C.

*Example 16*

A solution of 1.75 parts of 2-acetamido-7-methyl-5-n-propyl-s-triazolo-[2,3-c]pyrimidine in 22.5 parts of 8% aqueous sodium hydroxide at 18–22° C. is stirred and 1.9 parts of dimethyl sulphate are added dropwise. 30 minutes after the addition is completed, the suspension is cooled to 0° C., filtered and the solid residue is washed with ice water and dried at 60° C. It is then crystallized from ethyl acetate and there is thus obtained 7-methyl-2-methylamino-5-n-propyl - s - triazolo[2,3-c]pyrimidine, M.P. 120–122° C.

The 2 - acetamido-7-methyl-5-n-propyl-s-triazolo[2,3-c]pyrimidine, used as starting material may be obtained as follows:

5 parts of 2-amino-7-methyl-5-n-propyl-s-triazolo[2,3-c]pyrimidine, 12.5 parts of acetic acid and 13.7 parts of acetic anhydride are mixed and kept at 20° C. for 24 hours and then cooled to 0° C. and filtered. The solid residue is washed with cold ethanol and is then crystallized from ethanol. There is thus obtained 2-acetamido-7-methyl-5-n-propyl - s - triazolo[2,3-c]pyrimidine, M.P. 174° C.

The 2-amino - 7 - methyl-5-n-propyl-s-triazolo[2,3-c]pyrimidine used as starting material, may be obtained as follows:

5 parts of 6-hydrazino-4-methyl-2-n-propylpyrimidine, M.P. 87° C. (from 6-chloro-4-methyl-2-n-propylpyrimidine, B.P. 108–110° C./24 mm. and hydrazine hydrate in ethanol) are dissolved in 30 parts of 3.6% aqueous hydrochloric acid at 25° C. A stream of cyanogen chloride, previously washed with water, is bubbled through the solution which is maintained at 25–32° C. until 2 parts of the gas are absorbed. The resulting solution is sealed and allowed to stand for one hour at 18–22° C. Excess cyanogen chloride is then removed by evaporation under reduced pressure at 18–22° C. 10 parts of crystalline sodium acetate are then added and the mixture is cooled for one hour at 0° C. and is then filtered. The solid residue is washed thoroughly with water and is dried at 60° C. It is crystallized from ethanol and there is thus obtained 2-amino-7-methyl-5-n-propyl-s-triazolo[2,3-c]pyrimidine, M.P. 169° C.

Example 17

1 part of 2-acetylamino-8-bromo-7-methyl-5-n-propyl-s-triazolo[2,3-c]pyrimidine, M.P. 158–160° C. (from 2-amino-8-bromo-7-methyl-5-n-propyl-s-triazolo[2,3-c]pyrimidine and acetic anhydride by heating under reflux) is dissolved in 50 parts of N-sodium hydroxide solution at 20° C. 2 parts of dimethyl sulphate are added and the mixture is shaken and kept at 20° C. for 30 minutes. The mixture is then filtered and the residue is washed with water and dried. There is thus obtained 2-(N-acetyl-N-methyl)amino-8-bromo-7-methyl-5-n-propyl-s-triazolo[2,3-c]pyrimidine, M.P. 96° C. after crystallization from aqueous ethanol.

Example 18

5 parts of 2-acetylamino-5-ethyl-7-methyl-s-triazolo[2,3-c]pyrimidine, M.P. 184–185° C., 125 parts of N-sodium hydroxide solution and 10 parts of dimethyl sulphate are shaken at 20° C. for 16 hours. The mixture is then filtered and the residue is washed with water and dried. There is thus obtained 5-ethyl-7-methyl-2-methylamino-s-triazolo[2,3-c]pyrimidine, M.P. 180–182° C. after crystallization from aqueous ethanol.

Example 19

A mixture of 1.3 parts of 2-methylamino-5,7-di-n-propyl-s-triazolo[2,3-c]pyrimidine, 5 parts of acetic acid and 1.25 parts of acetic anhydride is kept for 16 hours at 18–22° C. and is then heated under reflux for 30 minutes. The resulting solution is evaporated to dryness under reduced pressure and the residue is crystallized twice from petroleum ether (B.P. 40–60° C.). There is thus obtained 2-(N-acetyl-N-methyl)amino-5,7-di-n-propyl-s-triazolo[2,3-c]pyrimidine, M.P. 41–43° C.

Example 20

1 part of 7-methyl-2-methylamino-5-n-propyl-s-triazolo[2,3-c]pyrimidine and 20 parts of pyridine are mixed and cooled to 0° C. 1 part of benzoyl chloride is added and the mixture is heated at 100° C. for 2 hours, cooled and poured into water. 2 N-hydrochloric acid is added until the mixture has pH 2.5. The mixture is then extracted with ether and the ethereal extract is dried over sodium sulphate and evaporated. The residue so obtained is dissolved in petroleum ether (B.P. 60–80° C.) and the solution is poured on to a column of alumina which is then washed with petroleum ether (B.P. 60–80° C.). The washings are rejected and the product is eluted from the column with methanol. The methanolic solution thus obtained is evaporated to small bulk and water is added. The mixture is filtered and the residue is washed with aqueous methanol and dried. There is thus obtained 2-(N-benzoyl-N-methyl)amino-7-methyl-5-n-propyl-s-triazolo[2,3-c]pyrimidine, M.P. 76° C. after crystallization from aqueous ethanol.

Example 21

1 part of propionyl chloride is added to a mixture of 1 part of 7-methyl-2-methylamino-5-n-propyl-s-triazolo[2,3-c]pyrimidine and 20 parts of pyridine at 0° C. and the mixture is then heated at 100° C. for 1 hour, cooled and poured into water. 2 N-hydrochloric acid is added until the mixture has pH=2 and the mixture is extracted into ether. The ethereal extract is dried over sodium sulphate and evaporated. The residue so obtained is boiled with petroleum ether (B.P. 60–80° C.) and the mixture is filtered and the filtrate is evaporated. There is thus obtained 7-methyl-2-(N-methyl-N-propionyl)-amino-5-n-propyl-s-triazolo[2,3-c]pyrimidine, M.P. 76° C. after crystallization from aqueous ethanol.

Example 22

1 part of 2-bromo-5-n-propyl-7-methyl-s-triazolo[2,3-c]-pyrimidine, 1 part of isopropylamine and 8 parts of dry ethanol are heated in a sealed tube at 150° C. for 48 hours and then cooled. The resulting solution is evaporated to dryness under reduced pressure and the residue is triturated with excess aqueous sodium hydroxide solution and then extracted with ethyl acetate. The ethyl acetate extract is dried and evaporated and the residual oil is crystallized from petroleum ether (B.P. 60–80° C.). There is thus obtained 2-isopropylamino-5-n-propyl-7-methyl-s-triazolo[2,3-c]pyrimidine, M.P. 94–96° C.

The 2-bromo-5-n-propyl-7-methyl-s-triazolo[2,3-]pyrimidine used as starting material may be obtained according to the procedure (i) or (ii) below:

(i) 20 parts of 2-amino-5-n-propyl-7-methyl-s-triazolo[2,3-c]pyrimidine, M.P. 169° C. (from 6-hydrazino-4-methyl-2-n-propylpyrimidine and cyanogen chloride in aqueous hydrochloric acid) are added gradually to 51 parts of 48% hydrobromic acid cooled to −15° C. 22.6 parts of bromine are added dropwise with stirring below 0° C. followed at once by a solution of 16.6 parts of sodium nitrite in 30 parts of water, also added dropwise below 0° C. The mixture is then stirred for a further 30 minutes at 0° C. and 116 parts of concentrated aqueous sodium hydroxide are added below 25° C. The resulting suspension is filtered and both the solid residue and the filtrate are extracted with ethyl acetate. The combined ethyl acetate extracts are dried and evaporated to dryness under reduced pressure. The residue is crystallized from petroleum ether (B.P. 60–80° C.) and there is thus obtained 2-bromo-5-n-propyl-7-methyl-s-triazolo[2,3-c]pyrimidine, M.P. 86–88° C.

(ii) 1 part of 2-hydroxy-5-n-propyl-7-methyl-s-triazolo[2,3-c]pyrimidine, M.P. 185–186° C. (from 2-n-propyl-4-methyl-6-carbethoxy hydrazine, pyrimidine, M.P. 115–116° C. obtainable from the corresponding chloro compound and carbethoxy hydrazine) and 5 parts of phosphorus oxybromide are heated for 2 hours at 140° C. The mixture is poured on to ice and excess sodium hydroxide and extracted with ethyl acetate to give the desired product, M.P. 86–88° C.

Example 23

The process described at the beginning of Example 22 is repeated and there is thus obtained from 1.55 parts of n-hexylamine, 2-n-hexylamino-5-n-propyl-7-methyl-s-triazolo[2,3-c]pyrimidine, M.P. 73–74° C. (from petroleum ether, B.P. 40–60° C.); from 1.3 parts of piperidine, 2-piperidino-5-n-propyl-7-methyl-s-triazolo[2,3-c]pyrimidine, M.P. 80–82° C. (from petroleum ether, B.P. 40–60° C.); from 1.28 parts of ethanolamine, 2-β-hydroxyethylamino-5-n-propyl-7-methyl-s-triazolo[2,3-c]pyrimidine, M.P. 129–130° C. (from ethyl acetate); from 2.54 parts of diethanolamine, 2-bis-(β-hydroxyethyl)amino-5-n-propyl-7-methyl-s-triazolo[2,3-c]pyrimidine, M.P. 97–98° C. (from ethyl acetate); from 2.42 parts of benzylamine, 2-benzylamino-5-n-propyl-7-methyl-s-triazolo[2,3-c]pyrimidine, M.P. 112–114° C. (from petroleum ether, B.P. 60–80° C.) and from 2.4 parts of morpholine, 2-morpholino-5-n-propyl-7-methyl-s-triazolo[2,3-c]pyrimidine, M.P. 92–94° C. (from petroleum ether, B.P. 40–60° C.).

*Example 24*

1 part of 2-bromo-5-n-propyl-7-methyl-s-triazolo[2,3-c]pyrimidine, 4.49 parts of di-n-hexylamine and 8 parts of dry ethanol are heated in a sealed tube at 150° C. for 48 hours and then cooled. The resulting solution is evaporated to dryness under reduced pressure and the residue is triturated with excess N-aqueous sodium hydroxide and then extracted with ethyl acetate. Evaporation of the ethyl acetate solution yields an oil which is subjected to steam distillation until all di-n-hexylamine is removed. The residue is cooled, extracted with ethyl acetate and the ethyl acetate solution is evaporated to dryness. The resulting oil is then crystallized from petroleum ether (B.P. 40–60° C.). There is thus obtained 2-di-n-hexylamino-5-n-propyl-7-methyl-s-triazolo[2,3-c]pyrimidine, M.P. 40–42° C.

*Example 25*

A mixture of 13 parts 2-methylsulphonyl-7-methyl-5-n-propyl-s-triazolo[2,3-c]pyrimidine and 17 parts piperidine are heated in a sealed tube at 120–130° C. for 16 hours. The mixture is diluted with water and there is thus obtained 7-methyl-2-piperidino-5-n-propyl-s-triazolo[2,3-c]pyrimidine, M.P. 80–82° C.

The 2-methylsulphonyl-7-methyl-5-n-propyl-s-triazolo[2,3-c]pyrimidine used as starting material may be obtained as follows:

12 parts 2-methylthiol-7-methyl-5-n-propyl-s-triazolo[2,3-c]pyrimidine, M.P. 55° C. (from 2-thiol-7-methyl-5-n-propyl-s-triazolo[2,3-c]pyrimidine, M.P. 216–217° C., and dimethyl sulphate in aqueous sodium carbonate, the said thiol compound being obtained from 4-hydrazino-6-methyl-2-n-propylpyrimidine and carbon disulphide in n-butanol at 130° C.) are added during 5 minutes, with stirring to 90 parts of concentrated sulphuric acid at 20–25° C. 25 parts of finely powdered ammonium persulphate are then added during 10 minutes, maintaining the temperature at 20–25° C. After stirring for a further 2½ hours the reaction mixture is added to 300 parts of ice-water, and the mixture is filtered. The solid residue is crystallized from methanol and there is thus obtained 2-methylsulphonyl-7-methyl-5-n-propyl-s-triazolo[2,3-c]pyrimidine, M.P. 127–128° C.

*Example 26*

25 parts 2-methylsulphonyl-7-methyl-5-n-propyl-s-triazolo[2,3-c]pyrimidine and 90 parts of a 20% w./w. solution of dimethylamine in ethanol are heated in a sealed tube at 120–130° C. for 16 hours. The cooled reaction mixture is diluted with 200 parts of water and the mixture is filtered. The solid residue so obtained is 2-dimethylamino-7-methyl-5-n-propyl-s-triazolo[2,3-c]pyrimidine, M.P. 92–93° C.

*Example 27*

5.1 parts 4-(N'-methylthioureido-N)2:6-dimethylpyrimidine, M.P. 156–157° C. (from 4-amino-2:6-dimethylpyrimidine and methylisothiocyanate in o-dichlorobenzene at 150° C.) are dissolved in 30 parts β-ethoxyethanol. 6.5 parts of hydrazine hydrate (64% w./w.) are added, and the mixture is stirred and heated at 125 to 130° C. 17.5 parts of litharge are then added in portions, and the suspension is stirred and heated under reflux for 30 minutes. After filtration from lead sulphide, the filtrate is evaporated in vacuo, and the residue is crystallized from ethanol. There is thus obtained 2-methylamino-5:7-dimethyl-s-triazolo[2,3-c]pyrimidine, M.P. 171–172° C.

By working in a similar manner, there is likewise obtained from 2-n-propyl-4-methyl-6-aminopyrimidine, M.P. 148–150° C. and methylisothiocyanate or ethylisothiocyanate or n-propylisothiocyanate, the corresponding 4-(N'-methyl-, N'-ethyl- or N'-n-propylthioureido-N)2-n-propyl-6-methylpyrimidines which on treatment with hydrazine hydrate provide the corresponding 2-methylamino-, 2-ethylamino- and 2-n-propylamino-5-n-propyl-7-methyl-s-triazolo[2,3-c]pyrimidines.

*Example 28*

23 parts of 4-(N'-n-butylthioureido-N-)-2:6-dimethylpyrimidine, M.P. 133–134° C. (from 4-amino-2:6-dimethylpyrimidine and n-butylisothiocyanate at 200° C. for 2 hours) are dissolved in a mixture of 200 parts of β-ethoxyethanol and 50 parts hydrazine hydrate (64% w./w.) at 50° C. 100 parts of litharge are added and the mixture is boiled gently for 5 minutes. After filtering from lead sulphide, the filtrate is evaporated in vacuo and the gummy residue is treated with petroleum ether (B.P. 60–80° C.) and dilute sulphuric acid to give a pH of 3.0. The mixture is filtered and the solid residue is crystallized from petroleum ether (B.P. 60–80° C.). There is thus obtained 2-n-butylamino-5:7-dimethyl-s-triazole[2,3-c]pyrimidine, M.P. 100–101° C.

*Example 29*

30 parts 5-ethyl-6-(N'-methylthioureido-N-)-2:4-di-n-propylpyrimidine (obtained from 6-amino-5-ethyl-2:4-di-n-propylpyrimidine and methylisothiocyanate at 150° C. for 12 hours) are dissolved in a mixture of 100 parts of β-ethoxyethanol and 50 parts hydrazine hydrate (64% w./w.). The solution is heated to 80° C. and 100 parts of litharge are added in portions. The mixture is then boiled gently for 5 minutes, and, after cooling to 80° C., is filtered from lead sulphide. The filtrate is evaporated in vacuo, and the residue is digested with water and sufficient dilute hydrochloric acid to give a mixture of pH 3 and is then filtered. The solid residue is crystallized from aqueous methanol and thus provides 8-ethyl-2-methylamino-5:7-di-n-propyl-s-triazolo[2,3-c]pyrimidine, M.P. 106° C.

*Example 30*

0.1 part of platinum oxide catalyst is added to a solution of 2.2 parts of 2-allylamino-5-n-propyl-7-methyl-s-triazolo[2,3-c]pyrimidine in 24 parts of ethanol and the mixture is shaken with hydrogen at 20° C. and atmosphere pressure for 40 minutes. The catalyst is removed by filtration, the filtrate is evaporated to dryness under reduced pressure and the residue is crystallized from petroleum ether (B.P. 60–80° C.). There is thus obtained 2-n-propylamino-5-n-propyl-7-methyl-s-triazolo[2,3c]pyrimidine, M.P. 97–98° C.

In a similar manner, there is obtained from 2-allyl-5-n-pentyl-7-methyl-s-triazolo[2,3-c]pyrimidine 2-n-propylamino-5-n-pentyl-7-methyl-s-triazolo[2,3-c]-pyrimidine, M.P. 88° C., and from 2-n-butylamino-5-n-propyl-7-methyl-8-allyl-s-triazolo[2,3-c]pyrimidine, 2-n-butylamino 5,8 di-n-propyl-7-methyl-s-triazolo[2,3-c]pyrimidine, M.P. 62–63°.

*Example 31*

1.4 parts of potassium permanganate in 180 parts of water are added to a solution of 1.55 parts of 2-n-butylamino-5-n-propyl-7-methyl-8-allyl-s-triazolo[2,3-c]pyrimidine in 160 parts of acetone at 18–22° C. and the mixture is kept at 18–22° C. for 1 hour and then filtered. The filtrate is evaporated under reduced pressure to a small volume and the mixture so obtained is then cooled at 0° C. for 20 hours and filtered. The solid residue is washed with ice-water and dried at 60° C. There is thus obtained 2-n-butylamino-5-n-propyl-7-methyl-8-(2',3'-dihydroxypropyl-1')-s-triazolo[2,3-c]pyrimidine, M.P. 158–160° C.

*Example 32*

A solution of 0.8 part of sodium salicylate in 2 parts of water is added to a solution of 0.1 part of 2-methylamino- 5-n-propyl-7-methyl-s-triazolo[2,3-c]-pyrimidine in the minimum quantity of 1N. hydrochloric acid at 20° C. The mixture is cooled to ice-water and the sticky precipitate is recovered by filtration and crystallized from ethanol. There is thus obtained 2-methylamino-5-n-propyl-7-methyl-s-triazolo[2,3-c]-pyrimidine salicylate, M.P. 80–82° C.

*Example 33*

0.1 part of 2-n-butylamino-5-n-propyl-7-methyl-8-allyl-s-triazolo[2,3-c]pyrimidine and 0.05 part of salicylic acid are dissolved in 1 part of warm ethanol. The solution is then cooled in ice-water and the precipitate is recovered by filtration, washed with a little ice-cold ethanol and dried in air. There is thus obtained 2-n-butylamino-5-n-propyl-7-methyl-8-allyl-s-triazolo[2,3-c]pyrimidine salicylate, M.P. 79–80° C.

*Example 34*

Dry hydrogen chloride is passed through a solution of 0.1 part of 2-n-butylamino-5-n-propyl-7-methyl-s-triazolo-[2,3-c]pyrimidine in 3 parts of dry ether, until no further precipitation occurs. The precipitate is recovered by filtration, washed with ether and dried in vacuo. There is thus obtained 2-n-butylamino-5-n-propyl-7-methyl-s-triazolo[2,3-c]pyrimidine hydrochloride, M.P. 127–129° C., after preliminary softening.

*Example 35*

1 part of 2-methylamino-5,7-di-n-propyl-s-triazolo-[2,3-c]pyrimidine is dissolved in the minimum quantity of 20% aqueous acetic acid at 18–22° C. Dowex 50–X or Zeocarb 225 resin is added gradually with stirring until the supernatant liquid no longer gives a precipitate with 2 N aqueous hydrochloric acid followed by sodium nitrite. The resin is removed by filtration and dried in air and there is thus obtained a resinate derivative of 2-methylamino-5,7-di-n-propyl-s-triazolo[2,3-c]pyrimidine.

*Example 36*

0.1 part of 2-methylamino-5,7-di-n-propyl-s-triazolo-[2,3-c]pyrimidine and 0.1 part of oxalic acid are dissolved in 2 parts of acetone. The solution is kept at 18–22° C. for 48 hours and then filtered. The solid residue is crystallized from ethyl acetate and there is thus obtained 2-methylamino-5,7-di-n-propyl-s-triazolo[2,3-c]pyrimidine oxalate, M.P. 110–112° C.

*Example 37*

The process described in Example 3 is repeated except that there are used as starting materials 6 parts of 2-n-propyl-4-methyl-6(4'-β-phenethylsemicarbazido-1')pyrimidine and 100 parts of phosphorus oxychloride. There is thus obtained 2-β-phenethylamino-5-n-propyl-7-methyl-s-triazolo[2,3-c]pyrimidine, M.P. 99–100° C. (from petroleum ether, B.P. 60–80° C.).

The 2-n-propyl-4-methyl-6(4'-β-phenethylsemicarbazido-1')pyrimidine used as starting material may be obtained by the procedure described at the end of Example 1 from 5 parts of 2-n-propyl-4-methyl-6-hydrazino-pyrimidine in 44 parts of dry benzene and 4.9 parts of β-phenethylisocyanate in 8.8 parts of dry benzene. There is thus obtained 2-n-propyl-4-methyl-6-(4'-β-phenethyl-semicarbazido-1')pyrimidine, M.P. 204° C.

*Example 38*

2.5 parts of 2-n-propyl-4-methyl-6(4'-n-butylsemicarbazido-1')pyrimidine are dissolved in 44 parts of boiling xylene. 5 parts of phosphorus pentoxide are added and the mixture is heated under reflux for 1 hour, cooled and then evaporated to dryness under reduced pressure. The residue is treated with ice and excess concentrated sodium hydroxide and then extracted with ethyl acetate. The ethyl acetate extract is dried, evaporated to dryness and the residue is crystallized from petroleum ether, B.P. 60–80° C. There is thus obtained 2-n-butylamino-5-n-propyl-7-methyl-s-triazolo[2,3-c]pyrimidine, M.P. 84–85° C.

*Example 39*

3 parts of 2-n-propyl-4-methyl-6(4'-isobutyl-s-ethyl-thiosemicarbazido-1')pyrimidine hydriodide are dissolved in 15 parts of 2-ethoxyethanol. 2 parts of litharge are added and the mixture is heated under reflux for 30 minutes, cooled and filtered. The filtrate is evaporated to dryness under reduced pressure and is then extracted exhaustively with boiling petroleum ether (B.P. 60–80° C.). Evaporation of the resulting extract yields an oil which is treated with excess picric acid dissolved in ethanol. There is thus obtained 2-isobutylamino-5-n-propyl-7-methyl-s-triazolo[2,3-c]pyrimidine picrate, M.P. 176–177° C. (from ethanol).

The picrate is treated with excess N aqueous hydrochloric acid and the mixture is extracted with ether. The acid solution remaining is neutralized with excess sodium hydroxide solution and the mixture is extracted with ethyl acetate. The ethyl acetate solution is dried and evaporated to dryness and the residue is crystallized from petroleum ether, B.P. 40–60° C. There is thus obtained 2-isobutylamino-5-n-propyl-7-methyl-s-triazolo[2,3-c]pyrimidine, M.P. 78–80° C.

The 2-n-propyl-4-methyl-6(4'-iso-butyl-s-ethylthiosemicarbazido-1')-pyrimidine hydriodide used as starting material may be prepared as follows:

2 parts of 2-n-propyl-4-methyl-6(4'-iso-butylthiosemicarbazido-1')-pyrimidine (obtainable from 6-hydrazino-4-methyl-2-n-propylpyrimidine and isobutylisothiocyanate according to the procedure at the end of Example 15) are dissolved in 8 parts of hot dry ethanol under reflux. 1.1 parts of ethyl iodide are added, the mixture is heated for 30 minutes under reflux, cooled and then evaporated to dryness under reduced pressure. There is thus obtained 2-n-propyl-4-methyl-6(4'-isobutyl-s-ethylthiosemicarbazido-1')-pyrimidine hydriodide as a pale yellow oil.

*Example 40*

3 parts of 2-n-propyl-4-methyl-6-(4'-isobutyl-s-ethyl-thiosemicarbazido-1')pyrimidine hydriodide are dissolved in 15 parts of 2-ethoxyethanol and the solution is heated under reflux for 30 minutes and then cooled and filtered. The reaction mixture is then worked up according to the procedure described in Example 39 and there is thus obtained 2-isobutylamino-5-n-propyl-7-methyl-s-triazolo-[2,3-c]pyrimidine, M.P. 78–80° C.

*Example 41*

A mixture of 10 parts of 2-methylamino-7-methyl-5-n-propyl-s-triazolo[2,3-c]pyrimidine, 75 parts of lactose and 22 parts of maize starch is granulated with a sufficient quantity of 10% maize starch paste and the moist mass so obtained is passed through a No. 12 mesh screen. The granules so obtained are dried in a current of air at 65° C. and are then passed through a No. 16 mesh screen to break down aggregates, 1 part of magnesium stearate is added and the mixture is then compressed into tablets containing the desired weight of active ingredient. Tablets containing 10 mg. or 20 mg. of active ingredient are suitable for therapeutic purposes.

The procedure described above is repeated using as active ingredient, 2-ethylamino-, 2-n-propylamino- or 2-allylamino-7-methyl-5-n-propyl-s-triazolo[2,3-c]pyrimidine, or 2-diethylamino-7-methyl-5-n-propyl-s-triazolo[2,3-c]pyrimidine, or 2-methylamino-5:7-di-n-propyl-s-triazolo[2,3-c]pyrimidine and there are likewise obtained tablets suitable for therapeutic purposes.

What we claim is:

1. An s-triazolo-[2,3-c]pyrimidine derivative having a formula selected from the group consisting of

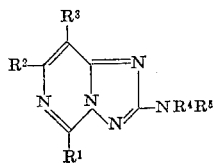

and

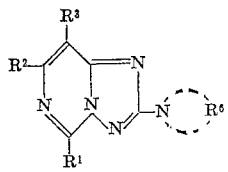

wherein $R^1$, $R^2$ and $R^3$ are selected from the group consisting of hydrogen, alkyl of up to seven carbon atoms, lower alkenyl, halogeno, trifluoromethyl and dihydroxypropyl; $R^4$ is selected from the group consisting of hydrogen, alkyl of not more than six carbon atoms and β-hydroxyethyl radicals; $R^5$ is selected from the group consisting of alkyl of not more than eight carbon atoms, lower alkenyl, β-hydroxyethyl, methoxycarbonylmethyl, benzyl, and β-phenylethyl radicals and $R^6$ represents the atoms necessary to complete with the adjacent nitrogen atom a ring from the group consisting of morpholino and piperidino; and the nontoxic, pharmaceutically-acceptable acid addition salts thereof.

2. The compound 2-methylamino-7-methyl-5-n-propyl-s-triazolo-[2,3-c]pyrimidine.

3. The compound 2-ethylamino-7-methyl-5-n-propyl-s-triazolo-[2,3-c]pyrimidine.

4. The compound 2 - n - propylamino-7-methyl-5-n-propyl-s-triazolo-[2,3-c]pyrimidine.

5. The compound 2-allylamino-7-methyl-5-n-propyl-s-triazolo-[2,3-c]pyrimidine.

6. The compound 2-diethylamino-7-methyl-5-n-propyl-s-triazolo-[2,3-c]pyrimidine.

7. The compound 2-methylamino-5:7-di-n-propyl-s-triazolo-[2,3-c]pyrimidine.

No references cited.